United States Patent [19]

Tanaka et al.

[11] 4,321,474
[45] Mar. 23, 1982

[54] OPTICAL SIGNAL TRANSMISSION APPARATUS

[75] Inventors: Eiichi Tanaka, Mitaka; Takehiro Tomitani, Chiba; Katsumi Takami, Tokyo; Kenji Ishimatsu, Abiko, all of Japan

[73] Assignees: National Institute of Radiological Sciences; Hitachi Medical Corporation, both of Tokyo, Japan

[21] Appl. No.: 105,925

[22] Filed: Dec. 21, 1979

[30] Foreign Application Priority Data

Dec. 28, 1978 [JP] Japan .................. 53/161165

[51] Int. Cl.³ ............................... G02B 27/00
[52] U.S. Cl. ..................... 250/551; 455/602
[58] Field of Search ............ 250/221, 222, 551, 229, 250/209, 578; 455/617, 602

[56] References Cited

U.S. PATENT DOCUMENTS 3,764,813  10/1973  Clement et al. ............... 250/551
4,190,318  2/1980  Upton ........................... 250/551
4,247,767  1/1981  O'Brien et al. ................ 250/221

Primary Examiner—David C. Nelms
Attorney, Agent, or Firm—Craig and Antonelli

[57] ABSTRACT

An apparatus for optically transmitting signals from a rotatable body to a stationary side or vice versa in a non-contact manner, includes a plurality of light emitting elements excited by a PCM signal from a signal source and a plurality of light receiving elements disposed in opposition with the light emitting elements for receiving light therefrom. A plurality of sets each including plural light receiving or emitting elements are provided at the stationary side in association with the respective light emitting or receiving elements disposed at the rotatable body side. Alternatively, a plurality of sets each including plural light emitting elements are provided at the rotatable body side in association with the respective light receiving elements disposed at the stationary side. The elements in such plural sets are selected in accordance with the rotation of the rotatable body.

3 Claims, 5 Drawing Figures

OPTICAL SIGNAL TRANSMISSION APPARATUS

The present invention relates to an apparatus for optically transmitting a signal and more particularly to an apparatus for optically transmitting a signal from a rotatable body to a stationary part or vice versa in a non-contact manner.

For means for transmitting information available from a rotatable body to a stationary part or unit, there have heretofore been employed a contacting system using a slip ring or a non-contacting system utilizing electromagnetic or accoustic waves. The former system suffers from many problems in respect of the useful lifetime or the generation of noises, while the latter system is disadvantageous in that a relatively complicated and bulky structure is required for implementation.

There has also been proposed a signal transmitting apparatus in which light emitting diodes (LEDs) are installed at the side of a rotor while light sensitive or receiving diodes are provided at the side of a stationary unit, whereby the signal transmission from the rotor side to the stationary side is effected through hollow optical guide means (see M. Vhle's "Electro-Anzeiger" 29 Jahrgang, Nr. 3, 1976, p.p. 37 to 39). However, the apparatus of this type encounters great difficulty in fabricating and mounting the required optical guides with a desired accuracy. Further, simultaneous transmission of a number of signals involves necessarily a structure or arrangement which is too complicated to be applied for practical purposes.

An object of the present invention is to eliminate various disadvantages of the hitherto known apparatus and provide an optical signal transmission apparatus which is capable of transmitting a number of signals at a high signal-to-noise ratio with a simplified arrangement.

According to one aspect of the present invention, there is provided an optical signal transmission apparatus comprising a plurality of light emitting elements, a plurality of light receiving elements disposed in opposition to each of said light emitting elements with a predetermined space therebetween, a signal source associated with said light emitting elements for exciting them into illumination, and selector means associated with said light receiving elements for sequentially selecting them with a predetermined period, whereby lights emitted from said light emitting elements are sequentially received by said light receiving elements with said predetermined period.

According to another aspect of the present invention, there is provided an optical signal transmission apparatus comprising a plurality of light receiving elements, a plurality of light emitting elements disposed in opposition to each of said light receiving elements with a predetermined space therebetween, a signal source associated with said light emitting elements for exciting them into illumination, and selector means associated with said light emitting elements for sequentially selecting them with a predetermined period, whereby lights emitted from the light emitting elements selected by said selector means are sequentially supplied to said light receiving elements.

The present invention will now be explained in conjunction with the accompanying drawings, in which.

Figure 1:
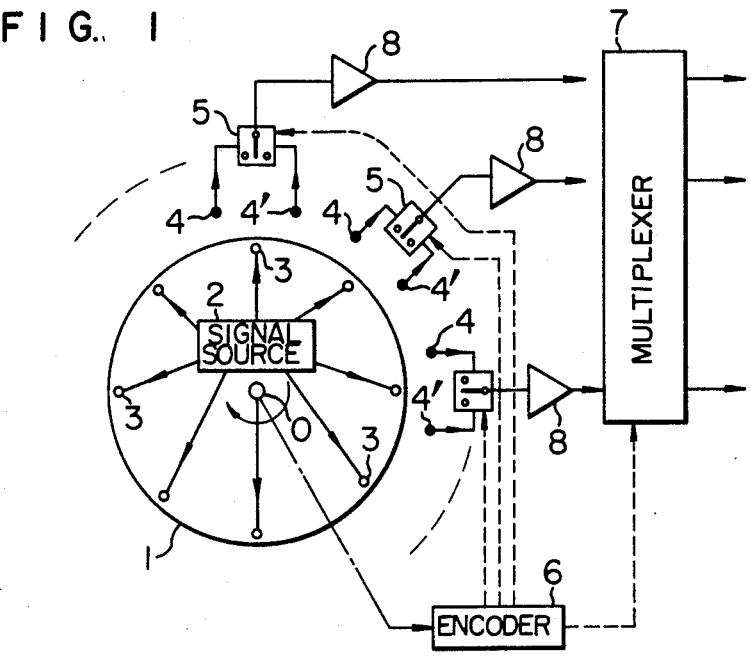
FIG. 1 shows schematically an arrangement of an optical signal transmission apparatus according to one embodiment of the present invention.

In FIG. 1 which shows a general arrangement of an optical signal transmission apparatus according to one embodiment of the present invention, there is shown primarily an arrangement of a portion for optically transmitting a signal from a rotating side to a stationary side.

Referring to FIG. 1, reference numeral 1 designates a rotatable body adapted to be rotated about a counter axis 0 in the direction indicated by an attached arrow, 2 a signal source incorporated in the rotatable body 1, and 3 semiconductor light emitting elements such as LED or semiconductor laser. A predetermined number of the light emitting elements 3 are distributed with an equi-distance along the peripheral portion of the rotatable body 1. The revolution number of the rotatable body 1 may be 60 r.p.m., for example, although it may of course be rotated at a higher or lower speed. A pulse code modulated (PCM) signal corresponding to a code to be transmitted (in the case of the illustrated embodiment, it is assumed that 8-bit code is adopted) is supplied from the signal source 2 to the light emitting elements 3 for excitation thereof into luminescence. On the other hand, there are provided at a stationary side a plurality of light receiving elements 4 and 4' (e.g. a pair of PIN diodes in the case of the illustrated embodiment) for every one of the light emitting elements. In the figure, only a few of the paired light receiving elements 4 and 4' are shown. The light receiving elements are disposed with an equi-distance therebetween.

The distance between the rotatable body 1 and the stationary part and hence the distance between the light emitting element 3 and the corresponding paired light receiving elements 4 and 4' is determined on the basis of the diameter of the rotatable body 1. For example, when the diameter of the rotatable body 1 is 7 cm, the space between the light emitting element 3 and the corresponding paired light receiving element 4 and 4' may be selected equal to 4 cm with the distance between the individual light receiving elements being in the order of 1 cm. In that case, sixteen light emitting elements 3 may be employed in combination with thirty-two light receiving elements 4 and 4'. On the assumption that the rotatable body 1 has a diameter of 70 cm, then the space between the light emitting element 3 and the paired light receiving elements 4 and 4' will be 2 cm with the distance between the individual light receiving elements being in the order of 3 cm. In that case, thirty-two light emitting elements and sixty-four light receiving elements may be employed. In this way, the space between the light emitting elements and the light receiving elements as well as the distance between the individual light receiving elements are varied in dependence on the size of the rotatable body. Further, the number of the light emitting elements and that of the light receiving elements as employed are correspondingly varied.

Reference numeral 5 designates signal selector means switchable at a high speed (e.g. semiconductor switches). An encoder 6 is provided for detecting a rotation angle of the rotatable body 1. Output signals from the encoder 6 are utilized for the changing-over of the successive selectors 5 as well as the switching in each selector 5 for selection of the light receiving elements 4 and 4' in synchronism with the rotation of the rotatable body 1, as indicated by broken lines. The signals from the light receiving elements selected by the selectors are supplied to respective amplifiers 8. A timing for the switching in each selector 5 for selection of the light receiving elements will be described by referring to FIG. 2.

Figure 2:
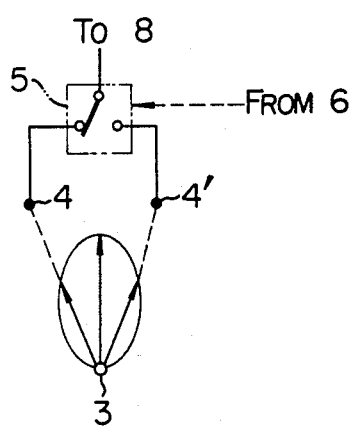
FIG. 2 is a view to illustrate operation of the apparatus shown in FIG. 1.

In general, the distribution of radiation emitted by the light emitting element will be such as shown in FIG. 2, when represented in a polar coordinate system. As can be understood from the Figure, at the time instant when the light emitting element 3 has been moved just to a center between the light receiving elements 4 and 4', the output signals of both the light receiving elements are of the lowest magnitude. When the light emitting element is displaced from the center or mid point even slightly toward either one of the paired light receiving elements, the magnitude of the output signal from the corresponding one of the paired light receiving elements 4 and 4' becomes greater than the other. Accordingly, a time point for the switching in the selector 5 from the element 4 to the element 4' is selected so as to correspond to the mid point between the paired light receiving element 4 and 4'. For example, when thirty-two light receiving elements are employed, the sequential selection of all the light receiving elements is effected for every fragmental rotation of 360°/32 with the reference angle 0° being selected at the mid point of any given pair of the light receiving elements.

Further, the space between the light emitting element 3 and the paired light receiving elements 4 and 4' as well as the distance between the light receiving elements 4 and 4' are so selected that the radiation intensity is directed from the light emitting element 3 toward the light receiving elements 4 and 4' in such a profile as shown in FIG. 2. This can be accomplished by selecting the inter-element distance in the above-described manner in dependence on the diameter of the rotatable body 1.

The output signals from the selectors 5 are reconstructed to the PCM signal originating from the signal source 2 and subsequently supplied to a signal processing circuit 7 constituted by a multiplexer which serves to select the input signal sequentially in dependence on the signal from the encoder 6 so that the individual signals transmitted from the rotatable body 1 appear constantly at the respective predetermined output terminals of the multiplexer 7. In this way, a number of signals produced at the side of the rotatable body 1 are transmitted to the associated output terminals of the multiplexer 7 provided at the stationary side.

Since the essential part of the present invention lies in the signal transmission and the signal processing constitute no essential part of the invention, any further description of the signal processing is omitted herein.

Figure 3:
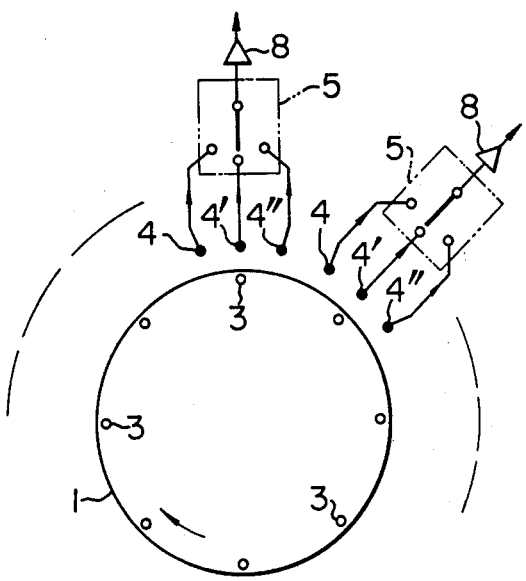
FIGS. 3, 4 and 5 show arrangements according to other embodiments of the present invention.

FIG. 3 illustrates another embodiment of the present invention in which at least three light receiving elements are provided in association with one light emitting element. In the embodiment shown in FIG. 1, when the rotatable body is of a small size, the provision of two light receiving elements for each light emitting element can assure extension of the radiation distribution from the light emitting element to the light receiving elements. However, when the rotatable body has a large diameter, there will arise a possibility that the intensity of input light to a selected light receiving element may become zero with the associated light emitting element being positioned at the mid point between the paired light receiving elements, because the light receiving elements are excessively spaced from each other. To deal with such problem, three light receiving elements 4, 4' and 4" for one light emitting element 3 in the embodiment shown in FIG. 3 are provided at the stationary side with equi-distance between the individual light receiving elements so that input light intensity of zero may not occur at a selected light receiving element. In that case, a multiplexer may be used for the selector 5. The light receiving elements are sequentially selected from one to another in synchronism with the rotation of the rotatable body 1 and by the output signal of an encoder which detects a rotation angle of the body 1. The encoder 6 and the multiplexer 7 shown in FIG. 1 are omitted from FIG. 3.

Figure 4:
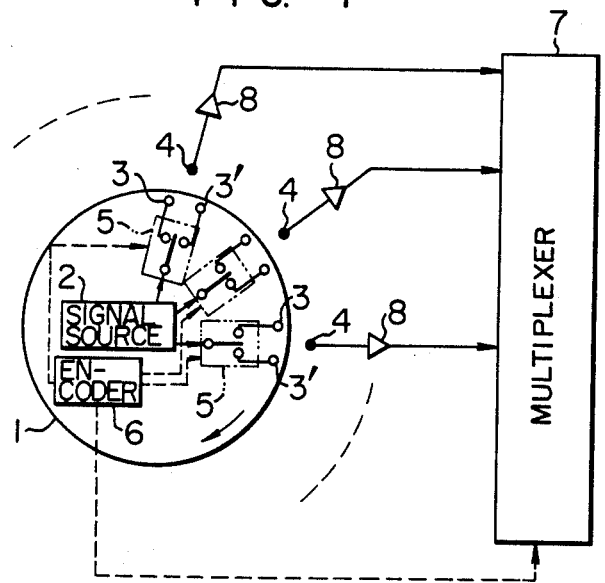

According to still another embodiment of the present invention, two or more light emitting elements may be provided at the rotatable body in correspondence to each light receiving element to attain similar effect as in the case of the arrangement shown in FIG. 1. FIG. 4 shows such an embodiment in which a pair of light emitting elements 3 and 3' are provided in correspondence to each light receiving element 4. Numerals 5 and 6 denote the selectors and the encoders as in the case of the arrangement shown in FIG. 1.

Figure 5:
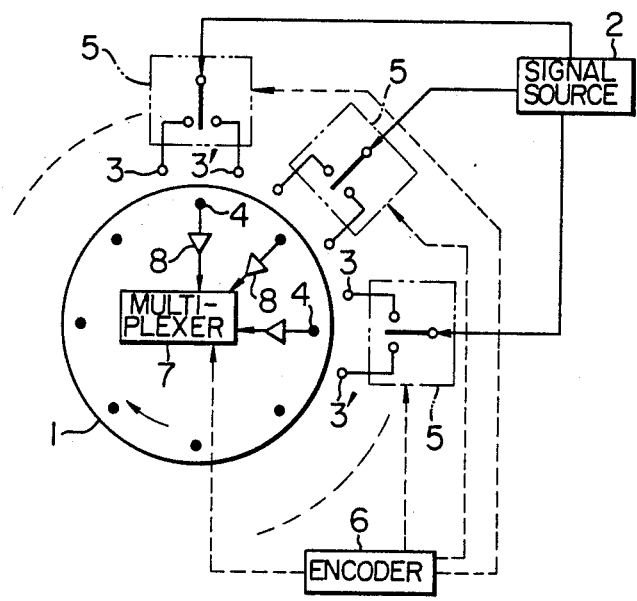

According to a further embodiment of the present invention, it is possible to make arrangement such that signals produced at the stationary side are received at the side of the rotatable body to be utilized for internal control of the latter. FIG. 5 illustrates such an embodiment. Referring to the figure, the signal from a signal source 2 is applied to the light emitting elements 3 and 3' through a selector 5 controlled by the output signal from an encoder 6. The light receiving elements 4 are disposed at the side of the rotatable body 1 in correspondence to the respective pairs of the light emitting elements 3 and 3'. The signals derived from the light receiving elements 4 are supplied through a multiplexer 7 to a control system (not shown) incorporated in the rotatable body 1.

Through FIGS. 1 and 3 have shown the equi-distance arrangement of the light receiving elements and FIGS. 4 and 5 have shown the equi-distance arrangement of the lights emitting elements, it should be noted that the distance between the elements in one pair (or set) may be different from that between elements adjacent to each other between the neibouring element pairs (or sets).

The optical signal transmission apparatus according to the present invention has the following advantages:

(i) Without using a complicated and expensive array type detector or CCDs as the light receiving elements, the signal transmission can be effected by employing solely the conventional miniature type light receiving elements such as PIN diodes.

(ii) Pulse code signals produced at the signal transmission side can be reproduced directly as the corresponding pulse code at the receiving side without requiring any particular complicated demodulating technique.

(iii) Transmission of large quantity of information with the aid of an increased number of codes can be accomplished simply by increasing the diameter of the rotatable body and the number of the light emitting and receiving elements thereby to increase the number of utilizable signal bits.

(iv) By virtue of the fact that LEDs and PIN diodes may be used as the light emitting elements and the light receiving elements respectively, it is possible to select a higher frequency for the signal source incomparable to the frequency for the signal transmission by electromagnetic wave.

What is claimed is:

1. An optical signal transmission apparatus comprising a plurality of light emitting elements, a pluraity of light receiving elements disposed in opposition to each of said light emitting elements with a predetermined space therebetween, a signal source associated with said light emitting elements for exciting them into illumination, and selector means associated with said light receiving elements for sequentially selecting them with a predetermined period, whereby lights emitted from said light emitting elements are sequentially received by said light receiving elements with said predetermined period, wherein said light emitting elements are provided in a rotatable body with a predetermined distance therebetween, said light receiving elements being selected in synchronism with the rotation of said rotatable body.

2. An optical signal transmission apparatus comprising a plurality of light receiving elements, a plurality of light emitting elements disposed in opposition to each of said light receiving elements with a predetermined space therebetween, a signal source associated with said light emitting elements for exciting them into illumination, and selector means associated with said light emitting elements for sequentially selecting them with a predetermined period, whereby lights emitted from the light emitting elements selected by said selector means are sequentially supplied to said light receiving elements, wherein said light emitting elements are provided in a rotatable body with a predetermined distance therebetween, said light emitting elements being selected in synchronism with the rotation of said rotatable body.

3. An optical signal trasmission apparatus according to claim 2, wherein said light receiving elements are provided in a rotatable body with a predetermined distance therebetween, said light emitting elements being selected in synchronism with the rotation of said rotatable body.

* * * * *